(12) United States Patent
Sudhakar

(10) Patent No.: US 9,530,005 B2
(45) Date of Patent: Dec. 27, 2016

(54) TECHNIQUES FOR SECURE DATA MANAGEMENT IN A DISTRIBUTED ENVIRONMENT

(71) Applicant: Novell, Inc., Provo, UT (US)

(72) Inventor: Gosukonda Naga Venkata Satya Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 14/948,786

(22) Filed: Nov. 23, 2015

(65) Prior Publication Data

US 2016/0132682 A1    May 12, 2016

Related U.S. Application Data

(63) Continuation of application No. 14/025,480, filed on Sep. 12, 2013, now Pat. No. 9,195,836, which is a
(Continued)

(51) Int. Cl.
| | |
|---|---|
| *G06F 12/14* | (2006.01) |
| *G06F 21/57* | (2013.01) |
| *H04L 9/08* | (2006.01) |
| *G06F 21/60* | (2013.01) |
| *H04L 9/32* | (2006.01) |
| *G06F 9/44* | (2006.01) |

(Continued)

(52) U.S. Cl.
CPC .......... *G06F 21/575* (2013.01); *G06F 9/4401* (2013.01); *G06F 21/57* (2013.01); *G06F 21/602* (2013.01); *H04L 9/083* (2013.01); *H04L 9/30* (2013.01); *H04L 9/3263* (2013.01); *H04L 63/0823* (2013.01); *H04L 63/10* (2013.01); *H04L 63/06* (2013.01)

(58) Field of Classification Search
CPC ..................................................... G06F 21/575
USPC ........................................................... 713/189
See application file for complete search history.

(56) References Cited

U.S. PATENT DOCUMENTS

| | | |
|---|---|---|
| 5,657,445 A | 8/1997 | Pearce |
| 5,751,813 A | 5/1998 | Dorenbos |

(Continued)

OTHER PUBLICATIONS

Feiertag et al., The foundations of a provably secure operating system, 1979, AFIFPS Press, SRI International, Menlo Park, CA, Proceedings of the National Computer Conference, pp. 329-334.*
U.S. Appl. No. 12/110,408, Restriction Requirement mailed Jun. 24, 2011, 6 pgs.
U.S. Appl. No. 12/110,408, Response filed Jul. 25, 2011 to Restrictioon Requirement mailed Jun. 24, 2011, 3 pgs.
(Continued)

*Primary Examiner* — Peter Shaw
(74) *Attorney, Agent, or Firm* — Schwegman Lundberg & Woessner, P.A.

(57) ABSTRACT

Techniques for secure data management in a distributed environment are provided. A secure server includes a modified operating system that just allows a kernel application to access a secure hard drive of the secure server. The hard drive comes prepackaged with a service public and private key pair for encryption and decryption services with other secure servers of a network. The hard drive also comes prepackaged with trust certificates to authenticate the other secure servers for secure socket layer (SSL) communications with one another, and the hard drive comes with a data encryption key, which is used to encrypt storage of the secure server. The kernel application is used during data restores, data backups, and/or data versioning operations to ensure secure data management for a distributed network of users.

6 Claims, 4 Drawing Sheets

Related U.S. Application Data continuation of application No. 12/110,408, filed on Apr. 28, 2008, now Pat. No. 8,539,229.

(51) Int. Cl.
*H04L 9/30* (2006.01)
*H04L 29/06* (2006.01)

(56) References Cited

U.S. PATENT DOCUMENTS

| | | | |
|---|---|---|---|
| 6,282,657 B1* | 8/2001 | Kaplan | G06F 8/60 711/E12.097 |
| 6,412,069 B1 | 6/2002 | Kavsan | |
| 6,816,900 B1 | 11/2004 | Vogel et al. | |
| 6,931,551 B2 | 8/2005 | Weng et al. | |
| 7,058,696 B1 | 6/2006 | Phillips et al. | |
| 7,328,341 B1 | 2/2008 | Eun et al. | |
| 7,461,148 B1 | 12/2008 | Beloussov et al. | |
| 8,539,229 B2 | 9/2013 | Sudhakar | |
| 9,195,836 B2 | 11/2015 | Sudhakar | |
| 2001/0044904 A1* | 11/2001 | Berg | G06F 21/52 726/26 |
| 2002/0111913 A1 | 8/2002 | Tallent et al. | |
| 2002/0169878 A1 | 11/2002 | Orenshteyn | |
| 2002/0174333 A1 | 11/2002 | Harrah et al. | |
| 2003/0188179 A1 | 10/2003 | Challener et al. | |
| 2003/0219121 A1 | 11/2003 | Van Someren | |
| 2004/0181668 A1 | 9/2004 | Blew et al. | |
| 2006/0015718 A1 | 1/2006 | Liu et al. | |
| 2006/0259487 A1 | 11/2006 | Havens et al. | |
| 2007/0198823 A1 | 8/2007 | Blew et al. | |
| 2008/0034199 A1 | 2/2008 | Nair et al. | |
| 2008/0247540 A1 | 10/2008 | Ahn et al. | |
| 2008/0307020 A1 | 12/2008 | Ko et al. | |
| 2009/0271620 A1 | 10/2009 | Sudhakar | |
| 2011/0083163 A1* | 4/2011 | Auvenshine | G06F 21/57 726/4 |
| 2014/0019772 A1 | 1/2014 | Sudhakar | |

OTHER PUBLICATIONS

U.S. Appl. No. 12/110,408, Non Final Office Action mailed Oct. 14, 2011, 16 pgs.
U.S. Appl. No. 12/110,408, Response filed Jan. 24, 2012 to Non Final Office Action mailed Oct. 14, 2011, 13 pgs.
U.S. Appl. No. 12/110,408, Final Office Action mailed Apr. 2, 2012, 18 pgs.
U.S. Appl. No. 12/110,408, Response filed Jun. 14, 2012 to Final Office Action mailed Apr. 2, 2012, 11 pgs.
U.S. Appl. No. 12/110,408, Advisory Action mailed Jun. 28, 2012, 3 pgs.
U.S. Appl. No. 12/110,408, Non Final Office Action mailed Sep. 5, 2012, 18 pgs.
U.S. Appl. No. 12/110,408, Response filed Dec. 5, 2012 to Non Final Office Action mailed Sep. 5, 2012, 11 pgs.
U.S. Appl. No. 12/110,408, Final Office Action mailed Dec. 31, 2012, 20 pgs.
U.S. Appl. No. 12/110,408, Response filed Feb. 28, 2013 to Final Office Action mailed Dec. 31, 2012, 11 pgs.
U.S. Appl. No. 12/110,408, Advisory Action mailed Mar. 11, 2013, 3 pgs.
U.S. Appl. No. 12/110,408, Notice of Allowance mailed May 23, 2013, 10 pgs.
U.S. Appl. No. 14/025,480, Preliminary Amendment filed Oct. 23, 2013, 7 pgs.
U.S. Appl. No. 14/025,480, Non Final Office Action mailed Aug. 27, 2014, 11 pgs.
U.S. Appl. No. 14/025,480, Response filed Nov. 26, 2014 to Non Final Office Action mailed Aug. 27, 2014, 8 pgs.
U.S. Appl. No. 14/025,480, Final Office Action mailed Jan. 23, 2015, 12 pgs.
U.S. Appl. No. 14/025,480, Response filed Mar. 25, 2015 to Final Office Action mailed Jan. 23, 2015, 9 pgs.
U.S. Appl. No. 14/025,480, Advisory Action mailed Apr. 3, 2015, 3 pgs.
U.S. Appl. No. 14/025,480, Notice of Allowance mailed Jul. 21, 2015, 10 pgs.

* cited by examiner

TECHNIQUES FOR SECURE DATA MANAGEMENT IN A DISTRIBUTED ENVIRONMENT

This application is a continuation of U.S. patent application Ser. No. 14/025,480, now issued as U.S. Pat. No. 9,195,836, filed Sep. 12, 2013, which is a continuation of U.S. patent application Ser. No. 12/110,408, filed on Apr. 28, 2008, now issued as U.S. Pat. No. 8,539,229, each of which is incorporated herein by reference in its entirety

BACKGROUND

Increasing the affairs of individuals and enterprises are being conducted in an automated manner over the Internet. Enterprises now engage in selling their products and services over the Internet; individuals also engage in communicating with one another over the Internet; employees may also engage in accessing secure resources of their employers over the Internet, etc.

Sensitive or private data is often accessed via the Internet from remote locations during user transactions. Preventing unauthorized access to this data can be critical to an enterprise or an individual. The data can include medical details, financial details, etc.

To enhance security of the data, the data is usually encrypted at the machine in which the data is natively stored. But, when the data has to be shared or accessed remotely then some significant issues can arise with the encryption and management of the data.

For example, suppose multiple users are authorized to access the data and one of those users is dismissed from an enterprise so that now just one fewer user is authorized to access the data. When this occurs, the data has to be re-encrypted so as to prevent the unauthorized user from accessing the data.

Consider another more detailed example, where complex key management is in place, within an enterprise, for the data, such that for each addition of a user to a directory or to a file, the encryption key of the file or directory is encrypted with the user's public key. Each time revocation to a user of a group that has access rights to the data happens, a lazy re-encryption can be done on the data. But, this means that there has to be an encryption key for each file and for each directory. Also, any addition of a new user to a group means that the encryption keys have to be made available to the new user. The owners of the files/directories have to supply the keys to the new user; this can only happen when the owners are logged in. Such a scenario cannot be done by a root designated resource.

However, a root designated resource can add him/her self as a user and read files and then delete him/her self from the group. Therefore, it appears that there should be another file permission model built at the encryption layer apart from the permissions present in an existing file system layer to prevent root access in the manner described. Root access can introduce a security hole where the data can be compromised. Yet, modifying existing file permission processing is not advisable and not practical in most situations and even if such a modification did occur to restrict root access, backing up the data without revealing the data/keys to the root is still not possible with conventional approaches.

Consequently, there is a need for improved techniques for securely managing data over a distributed network, such as the Internet.

SUMMARY

In various embodiments, techniques for secure data management in a distributed environment are provided. In an embodiment, a method for securely managing data is provided. More specifically, trust certificates are maintained for secure servers on a secure hard drive that is just accessible to a kernel of an Operating System (OS). The OS is modified to restrict access for a resource having root privileges from accessing the secure hard drive. A private key is maintained on the secure hard drive and is used to validate the trust certificates and is used to provide decryption services to the secure servers. Further, a random key is also maintained on the secure hard drive, which is used to encrypt data associated with one or more storage environments. The trust certificates, the private key, and a random key are pre-installed on the secure hard drive by a manufacturer or distributor of the secure servers. Moreover, the data is encrypted with the random key for backup, version control, and restore operations levied against the one or more storage environments.

DETAILED DESCRIPTION

A "resource" includes a user, content, a processing device, a node, a service, an application, a system, a gateway, a directory, a data store, a World-Wide Web (WWW) site, an end-user, groups of users, combinations of these things, etc. The terms "service," "module," "software," and "application" may be used interchangeably herein and refer to a type of software resource that includes instructions, which when executed by a machine performs operations that change the state of the machine and that may produce output.

A "client" or "client workstation" is machine (computer, processing device, etc.) that a user uses to access a secure network. The client includes a processing environment, and the processing environment has a configuration that includes information and setting related to a type and version of an operating system (OS) installed on the client and a particular file system. As used herein the terms "client," "desktop," "client machine," "client workstation," and "workstation" may be used interchangeably and synonymously.

A "server" is a machine that the client interacts with over a network, such as the Internet. The user, via its client, establishes a connection with the server for purposes of accessing and writing files to a processing environment of the server.

Various embodiments of this invention can be implemented in existing network architectures, storage systems, security systems, operating systems (OS's), data centers, and/or communication devices. For example, in some embodiments, the techniques presented herein are implemented in whole or in part in the Novell® network, proxy server products, LINUX OS, email products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
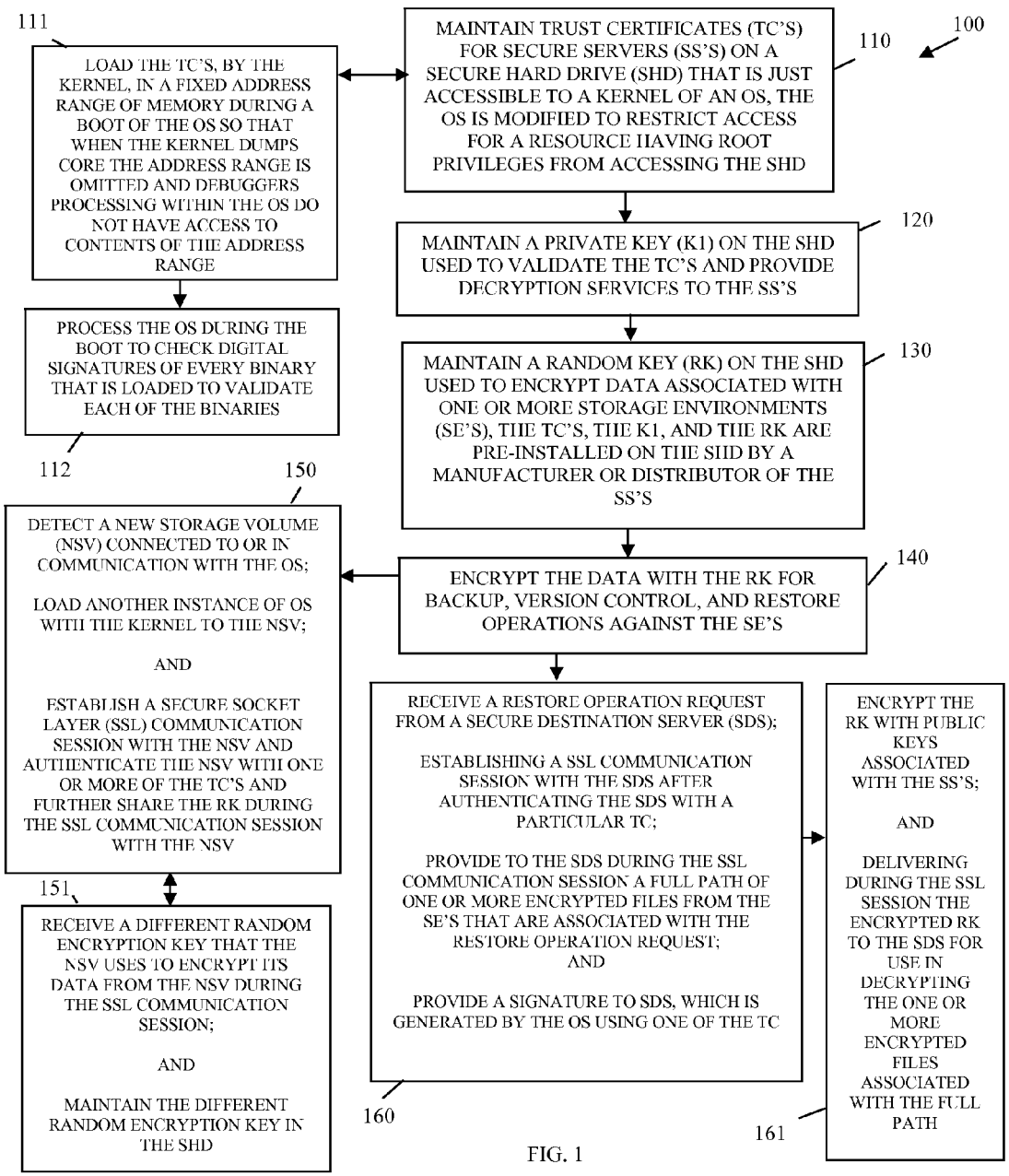
FIG. 1 is a diagram of a method for securely managing data, according to an example embodiment.

FIG. 1 is a diagram of a method 100 for securely managing data, according to an example embodiment, according to an example embodiment. The method 100 (herein after referred to as "rootless file server service") is implemented in a machine-accessible and computer-readable storage medium and instructions. The instructions when processed by one or more machines (computer, processing device, etc.) perform the processing depicted in the FIG. 1. The rootless file server service is operational over a network and the network is wired, wireless, or a combination of wired and wireless.

Initially, it is noted that the method 200 is referred to as a "rootless file server service" because the method 200 restricts a root designated resource of a server from accessing a secure hard drive and acquiring sensitive information. So, root resources are circumscribed from some access on the server. The details of how and why this is done are explained more completely herein and below.

At 110, the rootless file server service maintains trust certificates for secure servers on a secure hard drive. Information housed on the secure hard drive is only accessible or just accessible to a kernel process of an operating system (OS). The OS is modified to restrict access for a resource having root privileges. This is done to prevent a root designated resource from accessing the secure hard drive.

The rootless file server service processes on a secure server of a network. The rootless file server service provides a number of services to users that have access rights to the secure server, such as secure data encryption and data decryption. The details of this and other features of the rootless file server service are discussed more completely herein and below.

In an embodiment, the rootless file server service includes a special application installed with an OS that runs in the kernel mode of the OS. In this manner, the rootless file server service prevents all resources from accessing the secure hard drive, such that just the rootless file server service can access the secure hard drive. This is done without altering existing file systems and typical file permission processing.

The trust certificates are digital certificates (which are perhaps signed or validated by a trusted third-party certificate authority (CA)) used by the rootless file server service to validate or authenticate other secure servers for communication. Any communication occurring between the secure server of the rootless file server service and other secure servers over the network occurs via Secure Socket Layer (SSL) protocol or other secure, encrypted protocols. Initial authentication between the secure server and the other secure servers occurs via the trust certificates (presentation and validation).

According to an embodiment, at 111, the rootless file server service loads the trusted certificates (during startup or boot of the OS and secure server) into a fixed and predefined address range within memory of the secure server. By doing this, the rootless file server service is able to prevent processing core dumps (initiated by the OS kernel) from displaying the address range and is also able to prevent debuggers from gaining access to the address range. So, at no time are contents associated with the fixed address range in memory capable of being acquired by another resource (user or automated program).

Continuing with the embodiment of 111 and at 112, the rootless file server service processes the OS during the boot to check digital signatures of every binary that is loaded. This is done to ensure that the OS and all its processes are secure and authorized to process on the secure server. Each binary loaded onto the secure server including the OS (discussed below with reference to the method 200 of the FIG. 2) is validated within the secure server on startup.

At 120, the rootless file server service maintains a private key on the secure hard drive. This private key is used for validating trusted certificates when presented by the other secure servers and is used for providing decryption services to the other secure servers (discussed below).

At 130, the rootless file server service maintains a random key on the secure hard drive, which is used for encrypting data associated with one or more storage environments. Also, the trusted certificates, the private key, and the random key are all pre-installed on the secure hard drive by a manufacturer or distributer of the secure server. Thus, these keys and certificates are pre-configured and supplied with the secure server on the secure hard drive.

At 140, the rootless file server service encrypts the data with the random key for backup, version control, and restore operations against one or more storage environments interfaced to the secure server. The storage environments can include clusters of storage volumes or storage area networks (SAN's) interfaced to the secure server.

According to an embodiment, at 150, the rootless file server service detects a new storage volume connected to or in communication with the OS and thereby the secure server. In response to this situation, the rootless file server service causes another instance of the OS with the kernel processing of the rootless file server service to be loaded on the new storage volume. Next, a SSL communication session with the new storage volume is established and the new storage volume is authenticated with one or more of the trusted certificates. The random key is also shared during the SSL communication session with the new storage volume.

In a particular case, at 151, the rootless file server service can received a different random encryption key that the new storage volume uses to encrypt its data from the new storage volume. This different random encryption key is received during the SSL session discussed above at 150. In response, the rootless file server service maintains the different random encryption key in the secure hard drive.

In an embodiment, at 160, the rootless file server service receives a restore operation request from a secure destination server. Next, the rootless file server service establishes a SSL communication session with the secure destination server after authenticating the secure destination server with a particular trust certificate. At this point, the rootless file server service provides (during the SSL communication session) a full path to one or more encrypted files that exist on the storage environments, which are interfaced to the secure server. The one or more encrypted files are associated with the restore operation request that is being processed with the assistance of the rootless file server service. Finally, the rootless file server service also provides a signature to the secure destination server during the SSL session; the signature is generated by the OS using one of the trusted certificates. This information permits the secure destination server to securely acquire a full path to the desired files and a validation signature. It is noted that the secure destination server is also a secure server that includes an instance of the rootless file server service and that includes its own secure hard drive that is not accessible to a root designated resource. That hard drive of the secure destination server also includes a trust certificate for the secure server that is processing the rootless file server service. So, mutual authentication and trust can be established.

With the embodiment the previous embodiment, at 160, the secure destination server may lack the random key used to encrypt the files being requested. As such, at 161, the rootless file server service encrypts the random key with a plurality of public keys associated with the other secure servers. This is done so that should one other secure server be unavailable to decrypt the encrypted random key, there should be at least one other secure server around that can assist the secure destination server in decrypting the encrypted random key. Next, the encrypted random key is delivered during the SSL session to the secure destination server. The secure destination server then engages one of the available other secure servers in an authenticated and SSL communication session and has the encrypted random key decrypted. Once the random key is received, the secure destination server can decrypt the encrypted files received from the secure server and identified via the full path with the storage environment.

It is now appreciated how rootless data (e.g., file, etc.) management can be achieved via a distributed network environment. An example environment and features that can be achieved via the rootless file server service is now presented for further illustration.

Example Hardware Environment

The secure server is in a physical tamper resistant box which comes with a pre-installed public key certificate, private key & trusted certificates in a special hard disk (secure hard disk) that has very little space, e.g., a few MB. The public key certificate is a special type representing the secure server via a new secure server certificate. This special type of certificate is only issued for these kinds of secure servers (which are being discussed herein). These certificates can not be changed by anyone except the originating manufacturer or distributor of the secure servers. The Basic Input/Output System (BIOS) instruction set for the secure server only loads a certified OS for installation and for startup; the BIOS checks the signature of a binary for the OS to check whether the OS is actually from the OS developing company. This check can be achieved with the help of the pre-installed trusted certificates residing on the secure hard drive. The BIOS can also do Certificate Revocation List (CRL) checking, use Online Certificate Status Protocol (OCSP) to get certificate revocation statuses, etc.

In some cases, the OS can also come preinstalled from manufacturer on the secure server.

Example Software Configuration and Processing

Once the OS/bootstrap program is loaded, it immediately checks the signatures of all binaries that it is loading. A kernel process has access to the secure hard drive for purposes of reading the trusted certificates and the keys (discussed above and below). The kernel process does not allow any user at all to read the files from the secure hard drive; this includes no access for a root designated user.

The kernel process always loads the certificates, etc., in a fixed address range (say 0x00000000 to 0x0000FFFF) so that when the kernel dumps core, it will omit this address range. The debuggers will also not show the data in this address range. This ensures the certificates and keys are not compromised.

Essentially, the OS is modified to decrease permissions for root. Storage environments are encrypted via keys housed on the secure hard drive and just accessible to the kernel process. So, a root use is not be able to read even a plain text version of data in home directories or data volumes, albeit the root can still backup & restore the data. The data on the volume(s) of the secure server are encrypted with a random key. This random key is also stored in the secure hard drive.

Shared Storage and Cluster Environments

Any SAN, for example, can be connected to server and have its volumes encrypted. Moreover, each SAN has the OS loaded and includes the BIOS checking of the signatures for binaries; as a result, there is no risk of root/admin being able to access/modify a plain version of data on the SAN.

During the configuration of a cluster, the nodes communicate with one another the keys used for encryption of the shared volumes. For key sharing, the nodes establish SSL session between them selves and authenticate each other with the preinstalled certificates.

Backup and Restore Operations

The root user can read metadata in plain text and the data in encrypted form. The metadata of the file and the encrypted data of the file along with the full path of the file are signed by the secure server, which the backup program has to use while restoring.

While restoring, a backup program gives the full path of a file and a signature generated by a source server to a destination server. The destination server checks this signature and confirms that this was generated by another secure server and if so restores the data.

While restoring, in case of home directories, the restore is always a new restore. So, if "/home/sd" is backed up and is being restored, such that there is already a directory called "/home/sd" in the destination then that directory is deleted and the new data is restored to that directory. Another option for an administrator is to do a rename and a restore for user's home directory. i.e., for restoring a file, such as "/home/sd/dir1/dir2/file1." The administrator can choose to restore to another new location, such as "/home/sd_NEW/dir1/dir2/file1." One top director is a new directory (non-existent) in this case. The administrator can not restore the files to any random directory, as this can lead to security holes. When retrieving a fewer set of files from the secure server, once the files are restored, the users who have access to them can access them and copy them to any location that they want. When doing a full system restore, the existing directories are completely rewritten.

While restoring files, the directories are always restored first with their metadata and then the files are restored under the directories.

Sharing the Data Encryption Keys

The secure server encrypts the key with the public keys of mediators. The mediators are other secure servers, which are installed either on an enterprise Intranet or on the Internet. These other secure servers include their own secure hard drives (so that no one knows their private key except for those mediator servers themselves) and just include functionality for allowing SSL sessions with other secure cryptographic servers. The secure servers also decrypt whatever is sent to them during an SSL session. A client is a cryptographic server, which is verified using certificates; so, a mediator can decrypt a presented key from the client because the presented key is encrypted with the mediator's public key by the source server. The mediator returns the decrypted key to the destination server. For optimal recovery it is good to have this key encrypted by the source server with 3 to 4 different mediators' public keys, since if one mediator, which is on an Intranet is destroyed by a natural disaster then other Internet based mediators or mediators in another branch of an office located geographically at a safer distance can be used. The cryptographic servers can be configured for any number of mediators by supplying their public key certificates, since these certificates are signed by a trusted Certificate Authority (CA), such as VERISIGN, and installed on the secure hard drives of secure servers by the manufacture or distributor of mediator servers; thus, the mediator servers can be trusted.

Creation of Users & Groups

A root user (herein after referred to as "root") cannot create new users. Initially, all of the users defined by a pre-existing hierarchy are created by the manufacturer/distributor of the secure server and the needed passwords are registered, posted (snail mail), or otherwise communicated to those users. Afterwards any subsequently added new user has to be created by one of these pre-existing users. So, once a user is created, that user can create other new users. For example, if user A creates user B, then there also exists a parental relationship between A and B, which can be viewed by anyone on the secure server. However, only the parent user can set user identifiers (ID) and the properties of the user like the first name, middle name, the last name. Moreover, user 'A' can transfer A's parental relationship to C so that C becomes parent of B.

A group can also be created by any one of the users of the secure server. Other users can also join the groups. Moderation rights can be given by the owner of the group to others. The owner of a group is also that group's moderator.

Replicating Database of Users

The organization ID is the secure hash of the organization's name. This can also be securely embedded in the secure hard drive by the manufacturer/distributor for which the OS has access. The database of users is capable of being replicated across all secure servers that belong to a same organization.

Disabling/Deleting Users & Groups

No user can be deleted. However, those users who are in the higher level of the hierarchy can disable other users who are under them. This is useful when a user leaves the company.

The groups can also disabled by the owner of the groups when desired or needed.

Adding Users to Groups:

A user can send a request to be added to an existing group. The request is sent to group moderators. Once sent, any of the moderators can see who is the parent of the requesting user and depending on a trust level, add the user to the group or deny the user access to the group. Also, depending on a policy, any 'NI' members of the group can vote for the user to join the group and if a sufficient number of votes are obtained the user is added to the group. Once a user is successfully added to a group, a notification is sent to all moderators of the group.

For example, if a person joins a company, the team manager can create an account for that user. The manger becomes a parent to this user. If the user then wants to join a specific group, the user sends a request to that group. The group moderators know about the user from the user's name (ID) and if the moderators trust the manager, then the moderators trust this user to be a genuine user and if the user is authorized to have access then the moderators will add the user to the group.

As an another example, if a user who is not in the managerial cadre creates a new user with the user name of a CEO and sends the request for addition into a group then the group moderator can check who has created this user. Since the parent user is not an authorized user, the fake CEO user will not be added.

Hierarchical Rights

Those users who are in higher levels of a hierarchy have root access to the data of those users who are in lower levels of the hierarchy. But, for groups, the data is viewed from the hierarchy of the group's owner; so, if a task force (group) is formed the members can not see the data but the owner of the task force can see the data.

When creating files, a user's role is automatically chosen depending on where the files are being created. A user can also manually choose his/her role before creating any particular files or directories.

Also, with the arrangement discussed above, the encrypted data can be recovered in situations where a user leaves a company because the encrypted data is viewable and recoverable by any user at a higher level within the hierarchy.

A CEO user can be preset at the root of this hierarchical tree, in some embodiments. The CEO can be viewed as a special user, who can create another CEO user and transfer rights. The manufacturer/distributor of the secure server can also transfer physical access rights to the server; however, this is only done under special circumstances, such as the death of a CEO user.

Figure 2:
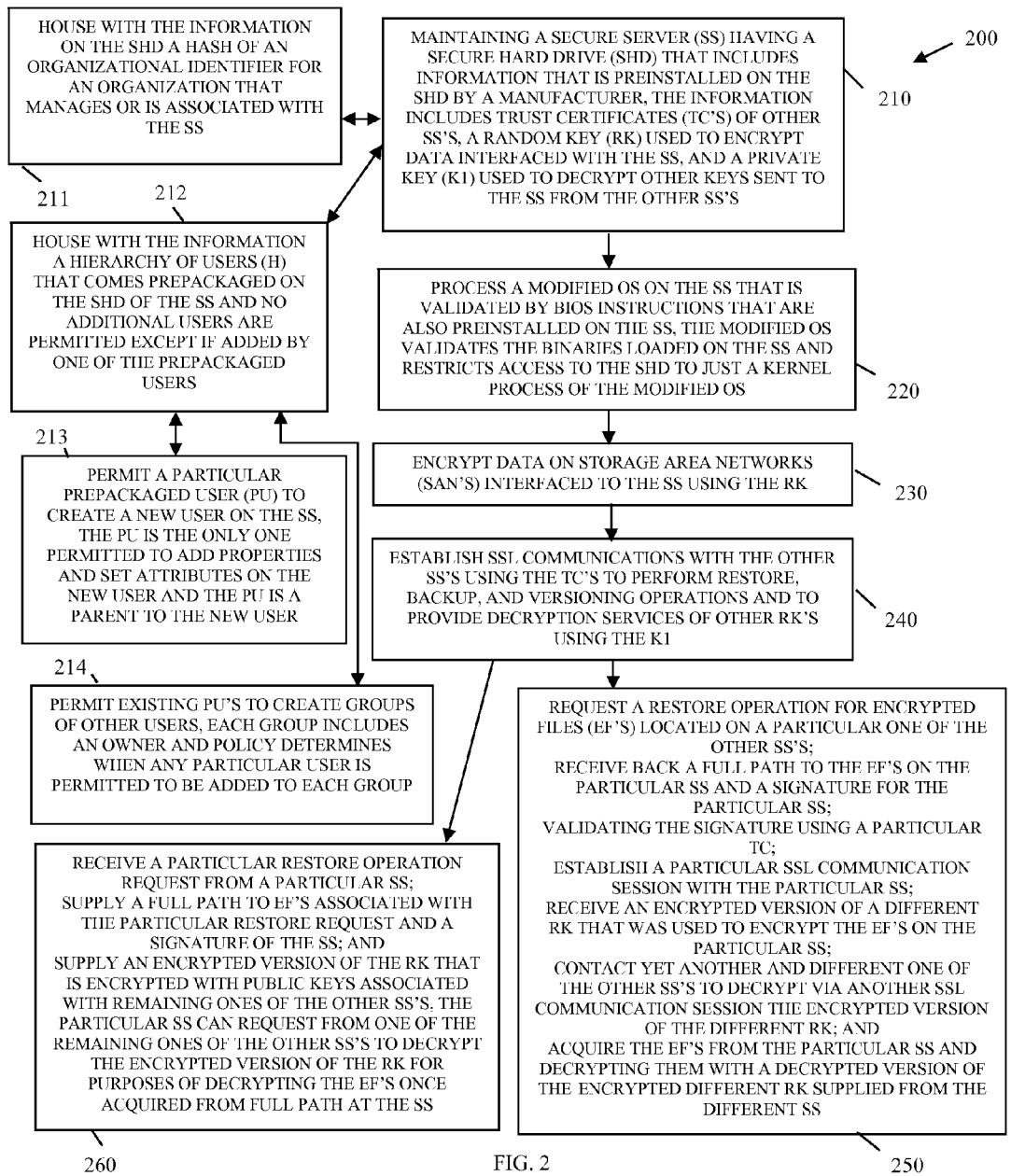
FIG. 2 is a diagram of another method for securely managing data, according to an example embodiment.

FIG. 2 is a diagram of another method 200 for securely managing data, according to an example embodiment. The method 200 (herein after referred to as "secure data management service") is implemented in a machine-accessible and computer-readable storage medium and instructions. The instructions when processed by one or more machines (computer, processing device, etc.) perform the processing depicted in the FIG. 2. The secure data management service is operational over a network and the network is wired, wireless, or a combination of wired and wireless.

The secure data management service presents a different perspective and in some cases enhanced perspective of the rootless file server service represented by the method 100 of the FIG. 1.

At 210, the secure data management service maintains a secure server. The secure server includes a secure hard drive or secure partition of an existing hard drive. Moreover, the secure hard drive includes preinstalled manufacturer information. The information includes trust certificates of other secure servers, a random key used to encrypt data interfaced to the secure server, and a private key used to decrypt other keys sent to the secure server from the other secure servers.

According to an embodiment, at 211, the secure data management service also houses with the information on the secure hard drive, a hash of an organization identifier for an organization that manages or is associated with the secure server. The hash algorithm that produces the hash may also reside on the secure hard drive and may also be prepackaged with the secure server.

In another situation, at 212, the secure data management server houses with the information on the secure hard drive, a hierarchy of users that also comes prepackaged on the secure hard drive of the secure server. No additional users are permitted, except for those users that are subsequently added by one of the prepackaged users. Example techniques and features associated with this embodiment was discussed above with reference to the example illustration that followed the discussion of the method 100 of the FIG. 1.

Continuing with the embodiment of 212 and at 213, the secure data management service permits a particular prepackaged user to create a new user on the secure server. The prepackaged user is the only one permitted to add properties and set attributes on the new user and the prepackaged user is a parent to the new user. Again, example processing associated with this embodiment was presented above with reference to the example illustration that followed the discussion of the method 100 of the FIG. 1.

In still another variation with the embodiment of 212 and at 214, the secure data management service permits existing prepackaged users to create groups of other users. Each group includes an owner and policy determines when any particular user is permitted to be added to each group. Again, example processing associated with this embodiment was presented above with reference to the example illustration that followed the discussion of the method 100 of the FIG. 1.

At 220, the secure data management service processes a modified OS on the secure server. The modified OS is validated by a prepackaged and preconfigured BIOS that is on the secure server. The modified OS also validates any and all binaries that are loaded on the secure server and ensures that access to the secure hard drive is restricted to just a kernel process of the modified OS. So, root cannot access the secure hard drive.

At 230, the secure data management service encrypts data on SAN's or storage volumes interfaced to the secure server using the random key residing on the secure hard drive via the kernel process.

At 240, the secure data management service establishes SSL communications with the other secure servers using the trusted certificates for purposes of performing restore, backup, and/or versioning operations and for purposes of providing decryption services of other random keys using the private key. So, when another secure server needs to acquire a random key to decrypt a set of data not its own where that random key was encrypted using the public key of the secure server, the secure data management service can decrypt that encrypted random key on behalf of that other secure server using that secure server's private key.

According to an embodiment, at 250, the secure data management service requests a restore operation for encrypted files located on a particular one of the other secure servers. In response, the secure data management service receives back from that particular server a full path to the encrypted files on the particular server along with a signature of the particular server. Next, the signature is validated using a particular trust certificate residing on the secure hard drive. Then, the secure data management service establishes a particular SSL communication session with the particular sever and the secure data management service receives an encrypted version of a different random key, which was used to encrypt the encrypted files on that particular sever. Now, the secure data management service contacts yet another and different one of the secure servers to have the encrypted different random key decrypted. This is done via another and different SSL communication session. Finally, the encrypted files are acquired and decrypted using the decrypted version of the different random key.

In another case, at 260, the secure data management service receives a particular restore operation request from a particular secure server. In response, the secure data management service supplies a full path to the encrypted files associated with the request along with a signature of the secure server. Next, the secure data management service supplies an encrypted version of the random key, which is encrypted with public keys associated with remaining ones of the other secure servers. The particular server can request that one of these other remaining secure servers decrypt the encrypted version of the random key for purposes of subsequently decrypting the encrypted files once acquired from the full path of the secure server.

Figure 3:
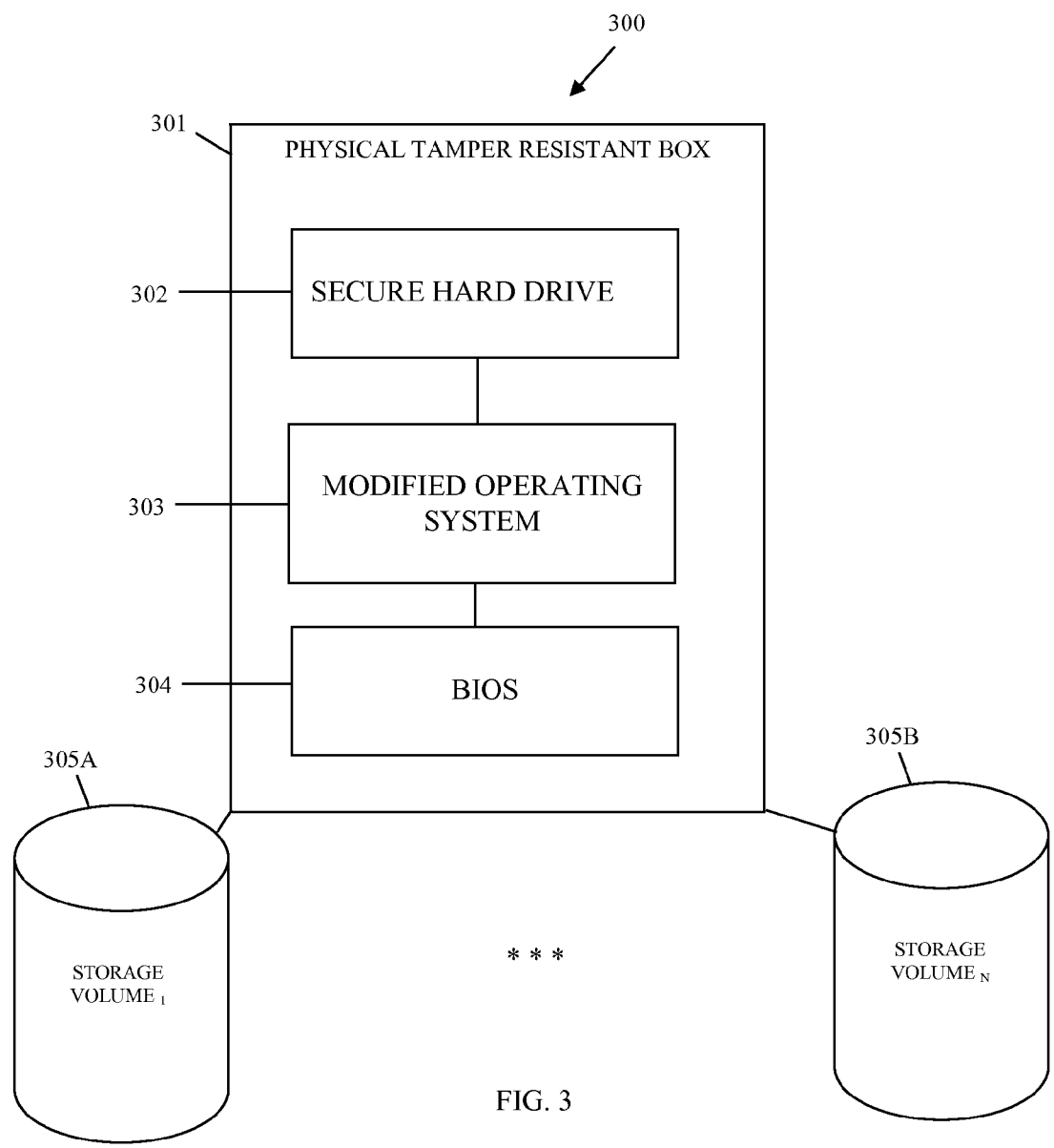
FIG. 3 is a diagram of a secure server, according to an example embodiment.

FIG. 3 is a diagram of a secure server 300, according to an example embodiment. The secure server 300 is implemented as instructions on or within a machine-accessible and computer-readable storage medium. The instructions when executed by a machine of a network perform, among other things, processing depicted with respect to the methods 100 and 200 of the FIGS. 1 and 2, respectively. The secure server 300 is also operational over a network, and the network is wired, wireless, or a combination of wired and wireless.

The secure server 300 includes a physical tamper resistant box 301, a secure hard drive 302, a modified operating system (OS) 303, a Basic Input/Output System (BIOS) instruction set 304, and one or more storage volumes 305A-305B. Each of these and their interactions with one another will now be discussed in turn.

The physical tamper resistant box 301 includes one or more processors, memory modules, and hard drives for non-volatile storage. The physical tamper resistant box 301 includes one or more processors, memory modules, and hard drives. Also, the physical tamper resistant box 301 includes the secure hard drive 302, the modified OS 303, and the BIOS 304.

The secure hard drive 302 is housed under and within the physical tamper resistant box 301. The secure hard drive 302 includes a variety of prepackaged and preconfigured information that comes with the physical tamper resistant box 301. Some of this information includes, a pre-installed public key for the secure server 300, a pre-installed private key for the secure server 300, a random data encryption key, and trust certificates associated with other secure servers 300.

In an embodiment, the secure hard drive 302 also includes a prepackaged hierarchy of pre-identified users of the secure server 300. Moreover, no additional users are permitted unless one of the pre-identified users creates a particular additional user. This scenario was discussed at length above with reference to the methods 100 and 200 of the FIGS. 1 and 2, respectively.

In another case, any particular user at a higher level of the hierarchy is automatically granted root access to data of other users that are at lower levels of the hierarchy.

Also, each of the pre-identified and prepackaged users are permitted to create groups that can access the secure server 300. Each group includes a particular owner that is associated with one of the pre-identified and pre-packaged users that created that particular group. Also, an owner of any particular group has or is given, via policy, root access to data of other members of that particular group.

The modified OS 303 is implemented in a machine-accessible and computer-readable storage medium on the physical tamper resistant box 301 (herein after referred to as "box 301") and executes on the processors of the box 301 and within the memory modules of the box 301.

The modified OS 303 processes on the physical tamper resistant box 301 upon boot up, start up, or restart of the physical tamper resistant box 301. Also, the modified OS 303 includes a kernel process that validates modules loaded to the memory modules during the boot up or restart. The kernel process also restricts access to resources identified as root on the physical tamper resistant box 301. Furthermore, the kernel process does not permit root resources to access the secure hard drive 302. Example processing associated with the kernel process and the modified OS 303 was described in detail above with reference to the methods 100 and 200 of the FIGS. 1 and 2, respectively.

The kernel is enabled to interact with backup, restore, and/or versioning operations that are initiated on the physical tamper resistant box 301. This permits secure encryption and decryption services of data being managed by the secure server 300 within a distributed network environment.

The BIOS instruction set 304 is implemented in a machine-accessible and computer-readable storage medium on the box 301. The BIOS instruction set 304 validates the modified OS 303 each time the modified OS 303 is started on the box 301.

The storage volumes 305A-305B are for housing data and managing data under the direct control of the box 301. The data is accessible via the box 301. The kernel process of the modified OS 303 using the random key housed on the secure hard drive 302 to encrypt that data on the storage volumes 305A-305B.

Figure 4:
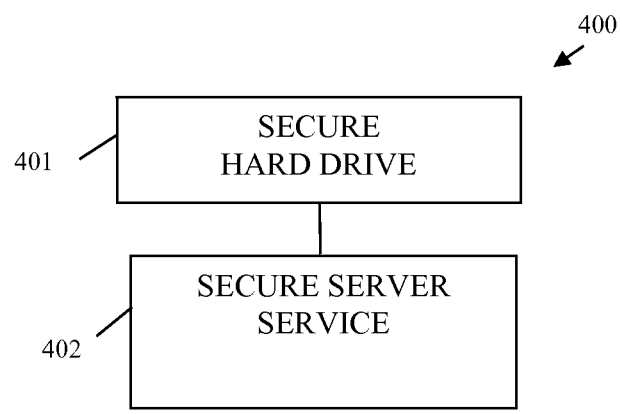
FIG. 4 is a diagram of secure data management system, according to an example embodiment.

FIG. 4 is a diagram of secure data management system 400, according to an example embodiment. The secure data management system 400 is implemented as instructions on or within a machine-accessible and computer-readable storage medium. The instructions when executed by one or more machines of a network perform, among other things, processing depicted with respect to the methods 100 and 200 of the FIGS. 1 and 2, respectively. The secure data management system 400 is also operational over a network, and the network is wired, wireless, or a combination of wired and wireless.

The secure data management system 400 includes a secure hard drive 401 and a secure server service 402. Each of these and their interactions with one another will now be discussed in turn.

The secure hard drive 401 is accessible to a server machine of the network.

The secure hard drive 401 includes prepackaged security information installed by a manufacturer or distributor of the secure hard drive 401. The security information includes a public key for the server, a private key for the server, trust certificates for other server machines, and a data encryption key.

According to an embodiment, the prepackaged security information also includes an initial prepackaged hierarchy of users that can access the encrypted storage data. The hierarchy can also include access rights for each of the users, such that a higher level user within the hierarchy has access rights to a lower level user within the hierarchy.

The secure server service 402 is implemented in a machine-accessible and computer-readable storage medium and processes on the server machine (hereinafter referred to as "server"). Example processing associated with the secure server service 402 was discussed in detail above with reference to the methods 100 and 200 of the FIGS. 1 and 2, respectively.

The secure server service 402 is processed at a kernel level of an OS, which executes on the server. So, the secure server service 402 has the ability and does restrict all access to the secure hard drive 401. Root privileges are overridden by the secure server service 402, such that root cannot access the secure hard drive 401. Essentially, the secure server service 402 restricts all access to the secure hard drive 401 regardless of any security role assigned to a user or an automated application, such that just the secure server service 402 has access to the secure hard drive 401.

The secure server service 402 uses the security information of the secure hard drive 401 to encrypt storage data interfaced to the server with the data encryption key.

The secure server service 402 also uses the public key to encrypt the data encryption key for delivery to other secure servers during SSL communications.

The secure server service 402 uses the private key to decrypt other data encryption keys received from the other servers. Furthermore, the secure server service 402 uses the trust certificates to authenticate the other secure servers during and to establish the SSL communications.

According to an embodiment, the secure server service 402 restricts where and how files are restored on the server during a restore operation initiated by an authorized resource. The details of where and how were presented with the example illustration that immediately followed the discussion of the method 100 of the FIG. 1 above.

It is now appreciate how secure data management can be achieved in a distributed environment. This is done without any compromise potential that may be present because of root access. In the approach presented, the secure data delivery is achieved without root access. The techniques provide a rootless cryptographic file server(s) that can share encryption keys and encrypted data. This is done without exposing the keys to a root designated resource of the file servers.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising: changing access permissions of a root resource to prevent access by the root resource to a secure storage during boot processing of a machine; installing and initiating on the machine a kernel application that modifies the Operating System (OS) of the machine; ensuring by the kernel application that the root resource has no access at all to the secure storage; permitting only the kernel application access to the secure storage; and permitting authenticated and secure network servers access to the secure storage during post-boot processing of the machine.

2. The method of claim 1, wherein permitting further includes encrypting, by the kernel application, communications received from the secure network servers that are directed to the secure storage.

3. The method of claim 2, wherein encrypting further includes decrypting, by the kernel application, response communications received from the secure storage.

4. The method of claim 1, permitting further includes maintaining private and public keys by the secure storage for encryption and decryption services associated with communication with the secure network servers.

5. The method of claim 4, wherein managing further includes acquiring the private keys as predefined and prefabricated keys that come bundled with the secure storage.

6. The method of claim 1, wherein changing further includes checking, on the machine, digital signatures for each binary loaded during the boot, wherein the digital signatures are stored in the secure storage.

* * * * *